United States Patent [19]

Kosmaczeska

[11] Patent Number: 5,469,807
[45] Date of Patent: Nov. 28, 1995

[54] EXPANDABLE WINDOW PET BIN

[76] Inventor: Alicia Kosmaczeska, 333 Beach 32nd St., Far Rockaway, N.Y. 11691

[21] Appl. No.: 205,589

[22] Filed: Mar. 3, 1994

[51] Int. Cl.$^6$ ..................................................... A01K 1/02
[52] U.S. Cl. ............................................................. 119/19
[58] Field of Search ............................... 119/15, 17, 19, 119/161, 165, 168

[56] References Cited

U.S. PATENT DOCUMENTS

| | | | |
|---|---|---|---|
| 4,057,031 | 11/1977 | Williams | 119/1 |
| 4,445,459 | 5/1984 | Julie | 119/19 X |
| 4,520,758 | 6/1985 | Pfriender | 119/19 |
| 4,989,546 | 2/1991 | Cannaday | 119/19 |
| 5,148,767 | 9/1992 | Torchio | 119/19 |
| 5,165,366 | 11/1992 | Harvey | 119/165 |
| 5,167,202 | 12/1992 | Bradford et al. | 119/15 |
| 5,195,457 | 3/1993 | Namanay | 119/19 |
| 5,337,697 | 8/1994 | Trimarchi et al. | 119/19 |

*Primary Examiner*—Gene Mancene
*Assistant Examiner*—Thomas Price
*Attorney, Agent, or Firm*—Alfred Walker

[57] ABSTRACT

The open mesh bin container of the present invention provides an owner of a cat or pet with the visibility of the cat or pet while the animal is resting in the container, allowing the pet owner to view the cat or pet in the pet enclosure bin as well as for the pet to see both the outside environment and interior of an apartment. The bin of the present invention permits a pet bin to be expanded in size while permitting the window to fully close when the bin is not in use.

8 Claims, 6 Drawing Sheets

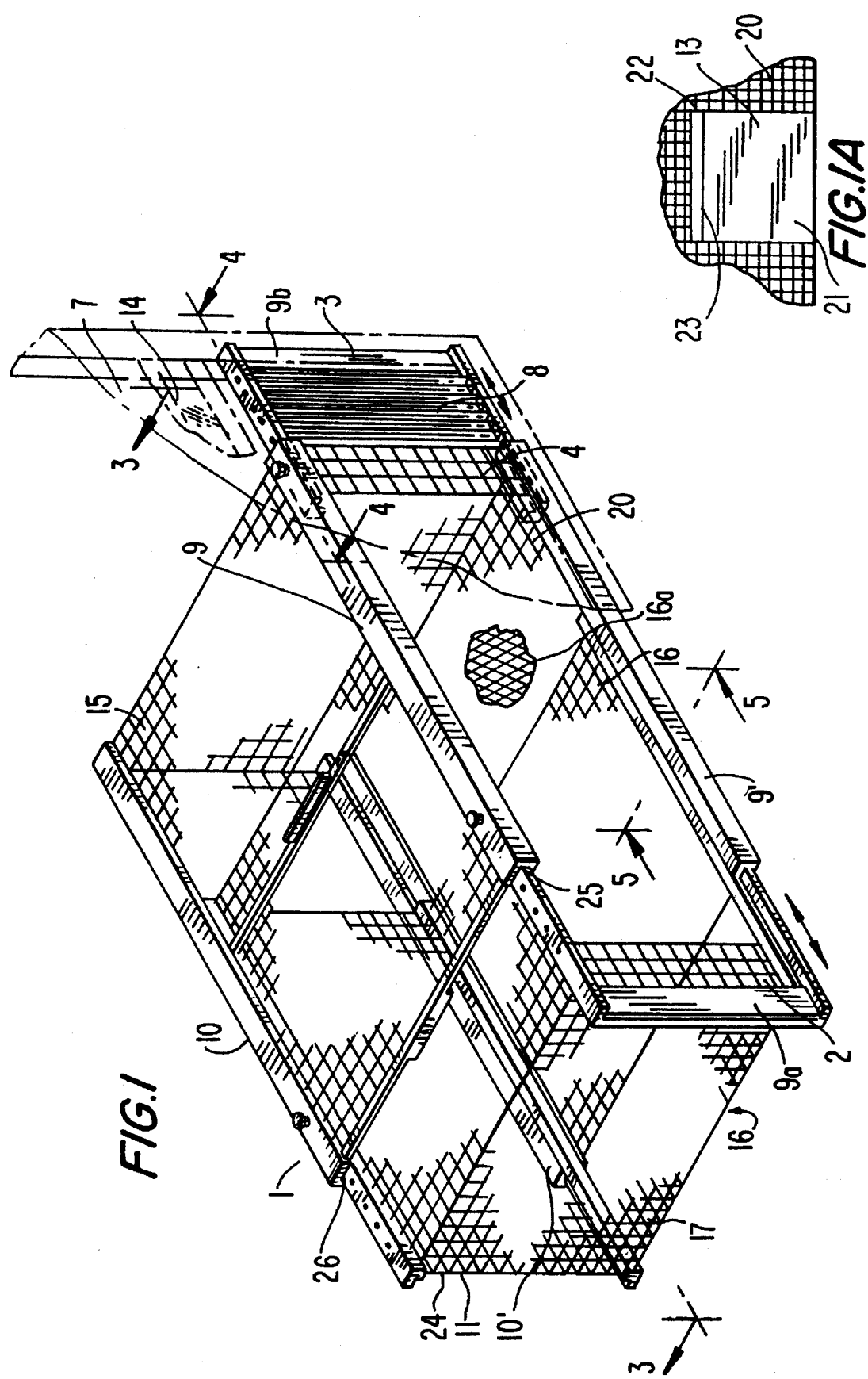

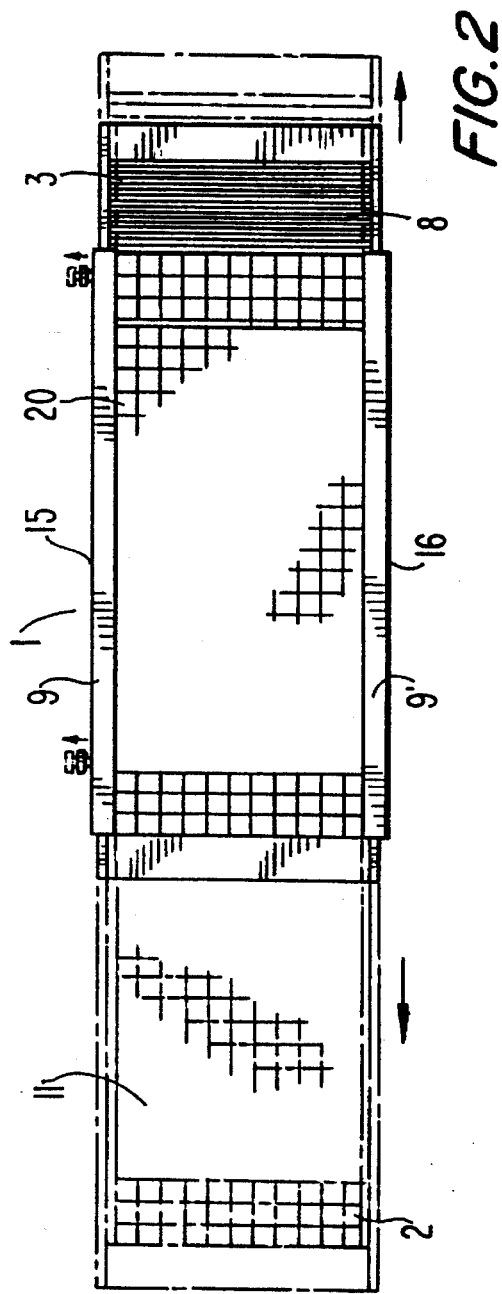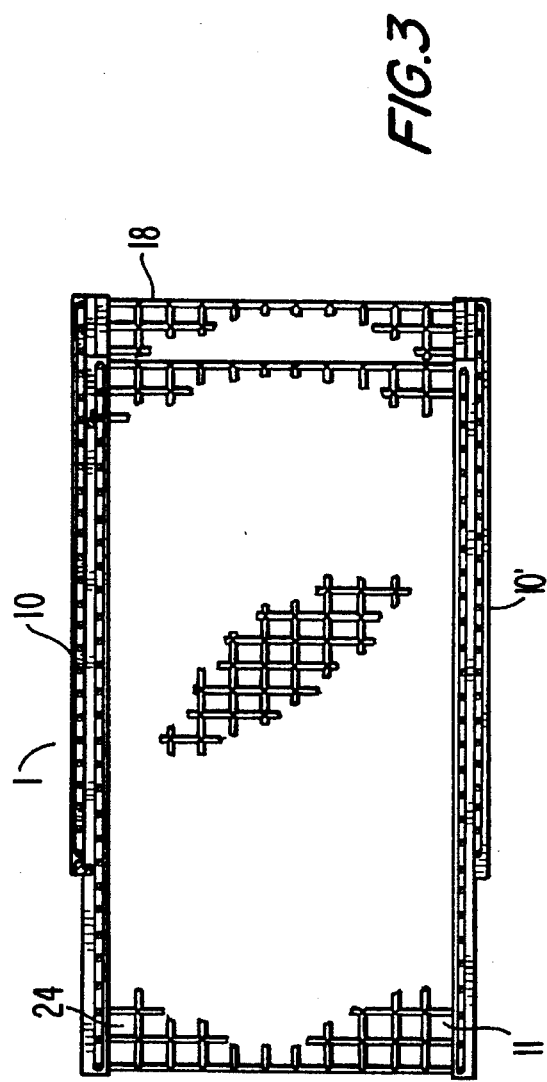

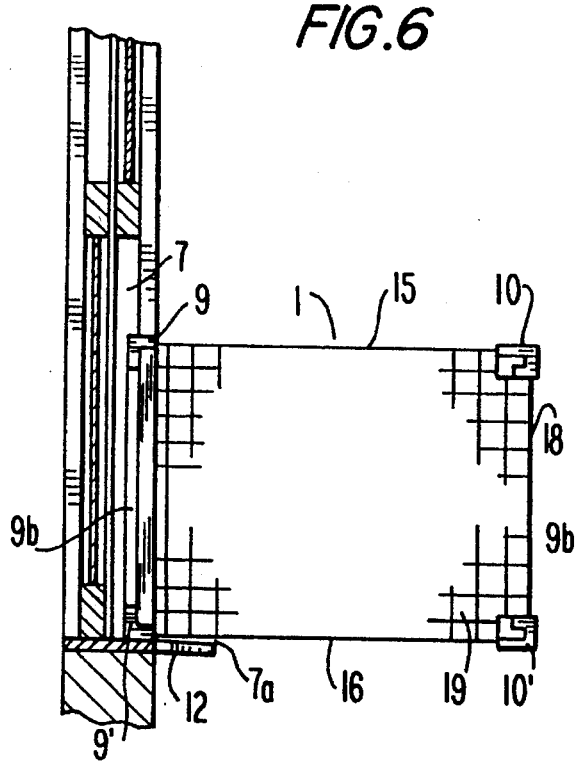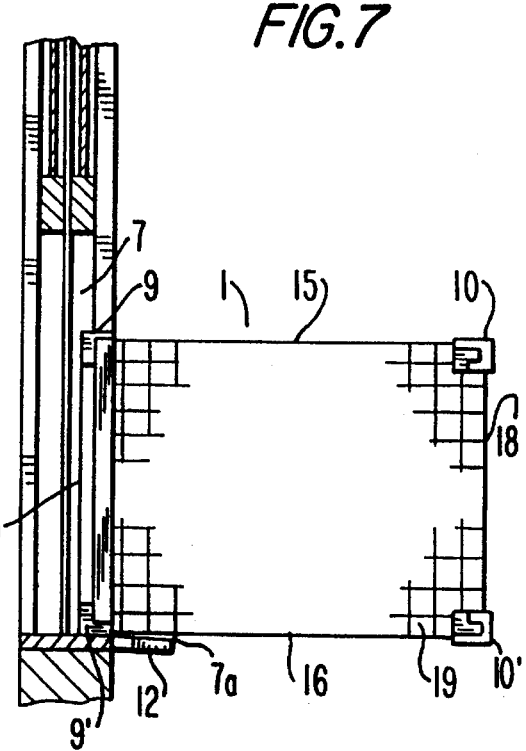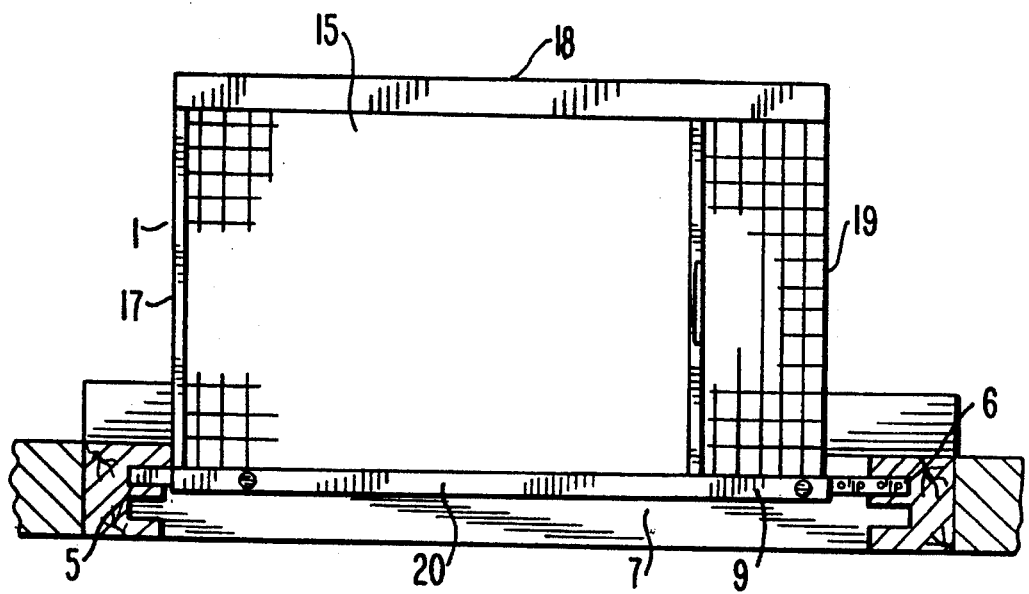

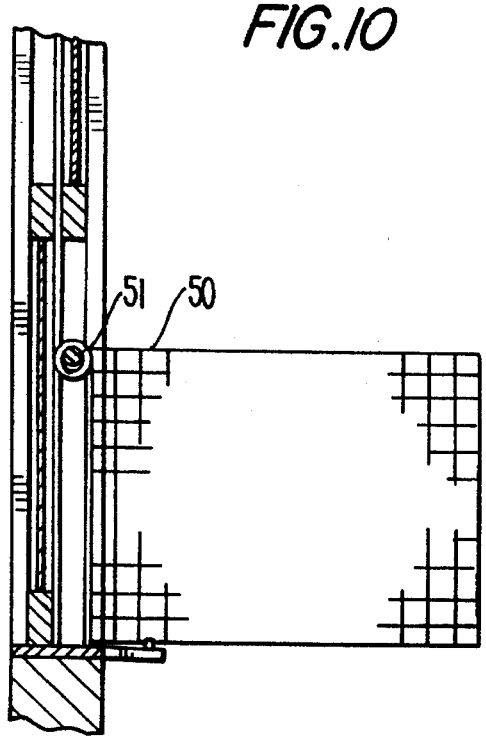
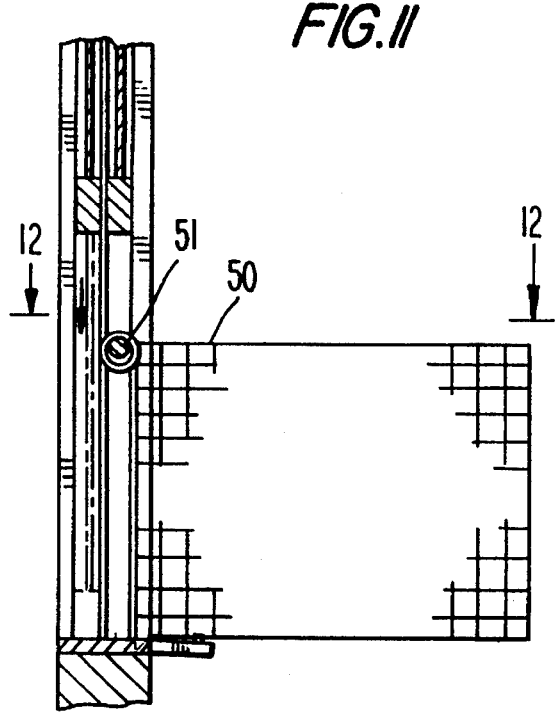
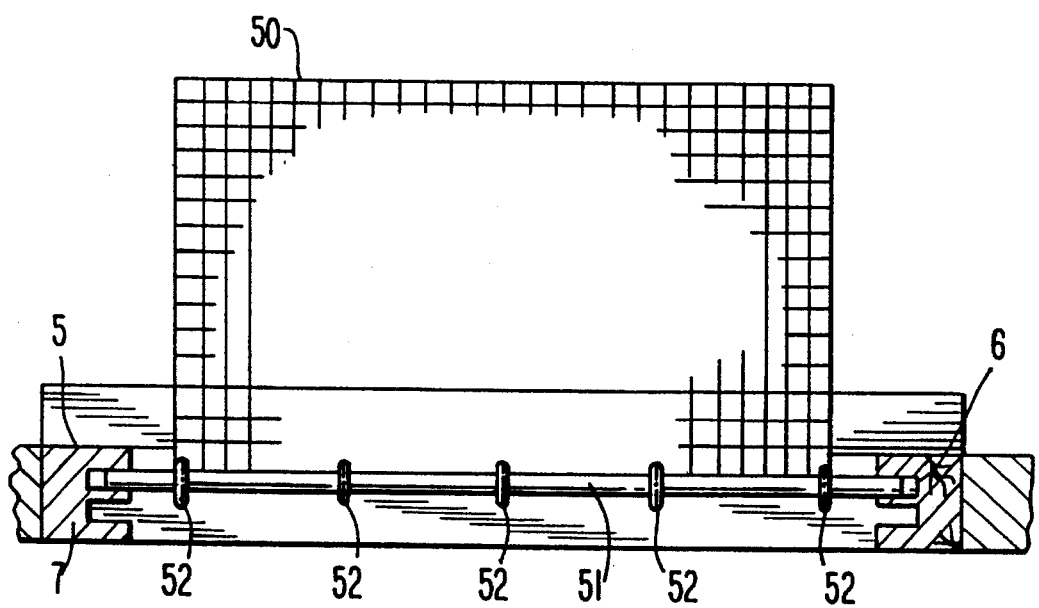

EXPANDABLE WINDOW PET BIN

BACKGROUND OF THE INVENTION

1. Field of the Invention

This invention relates to pet containers and more particularly to arrangements for easily permitting house pets such as cats to enjoy fresh air outdoors while protected in a bin.

2. Description of the Prior Art

Window containers for securing pets are well known. These include external boxes permanently removably attached to houses and between which cats may travel. Also, the mounting of air conditioners in windows is well known in the art.

U.S. Pat. No. 5,167,202 of Bradford discloses a window pet porch open to the outside, including a caged bin assembly held in place by support hooks which extend over the window sill.

U.S. Pat. No. 5,195,457 of Namanny describes a pet enclosure opened to the outside, to be mounted to a window sill by locking brackets.

U.S. Pat. No. 4,057,031 of Williams describes a flat perch for a cat to sit on inside a closed window. It does not disclose a bin openable to the exterior.

U.S. Pat. No. 4,445,459 of Julie describes a pet enclosure bin opened to the outside, which is held in place at a window sill by a pair of brackets and an exterior brace which touches the outside wall. The walls are cage-like.

U.S. Pat. No. 4,520,758 of Pfriender discloses a pyramid shaped animal container which includes a flat perch on top for an animal to sit on to look outside through a closed window. It does not disclose a bin with an exposure to the outside.

Of these issued patents, the Bradford, Namanny and Julie patents all disclose a pet enclosure bin with cage-like walls which is held outside of a window over a window sill. However, the prior art patents each include an impediment preventing the user from fully closing the window when the bins are placed in the window opening. For example, the Bradford and Julie Patents disclose C-shaped hooks which interfere with the complete closure of the window.

None of these three patents disclose a fastener such as a slidable expandable portion of the cage, or a dowel with pipe type fasteners.

In other words the significant distinguishing feature between the present invention and the bins of the Bradford, Namanny or Julie patents is the way that the enclosure bin is mounted to the window sill, and how the bin may expand in size.

OBJECT OF THE INVENTION

It is advantageous to keep house pets isolated from outdoors to prevent injury to the animal and to isolate the animal from other ill animals. The present invention allows a cat or other pet access to fresh air and sunshine.

According it is an object of this invention to provide an open screened bin container to allow cats and other household pets the freedom to venture outside into the fresh air, while remaining protected.

A further object of the invention is to provide an outdoor bin through which a cat can travel at its own will.

It is a still further object of the invention is to isolate a cat or small animal from other animals.

Another object of the invention is to provide a bin which can be observed from inside the apartment.

It is yet another object of the invention to provide a window case that can be easily maintained.

It is a further object to provide a window bin for a pet which can be expanded in size.

It is yet another object to provide a bin which is secured in place.

SUMMARY OF THE INVENTION

The objects of the invention are achieved through the present invention for a window pet bin having a bottom floor and top roof interconnected by four vertical walls, wherein the walls are of a screen or open cage wire configuration. An opening, on the interior facing side, is provided. The bin container can be easily installed into an apartment window frame. To hold the bin container in place, laterally moving panels slide within vertical channels of a standard window frame. In the preferred embodiment, at least one of the slidable panels is connected to, and forms a front face for a further bin extension, which expands the size of the bin when the extension slides outward from the bin.

BRIEF DESCRIPTION OF THE DRAWINGS

These and other objects, features and advantages of the invention will be apparent from review of the specification when read in conjunction with the accompanying drawings wherein:

FIG. 1 is a perspective view of the bin of the present invention.

FIG. 1A is a closeup front view of an optional door for the bin as in FIG. 1.

FIG. 2 is a front elevational view of the bin in FIG. 1.

FIG. 3 is a cross-sectional view of the bin as in FIG. 1, along lines 3—3.

FIG. 6 is a side elevational view of the bin as in FIG. 1, shown installed in a closed window.

FIG. 7 is a side elevational view of the bin as in FIG. 1, shown installed in an open window.

FIG. 8 is a top plan view of the bin as in FIG. 1.

FIG. 10 is a side elevational view of an alternate embodiment, showing the bin installed in an open window, along lines 10—10 of FIG. 9.

FIG. 11 is a side elevational view of the bin, as in FIG. 10 showing the bin installed in a closed window.

FIGS. 12 is a top plan view of the alternate embodiment of the present invention.

DETAILED DESCRIPTION OF THE DRAWINGS

Figure 4:
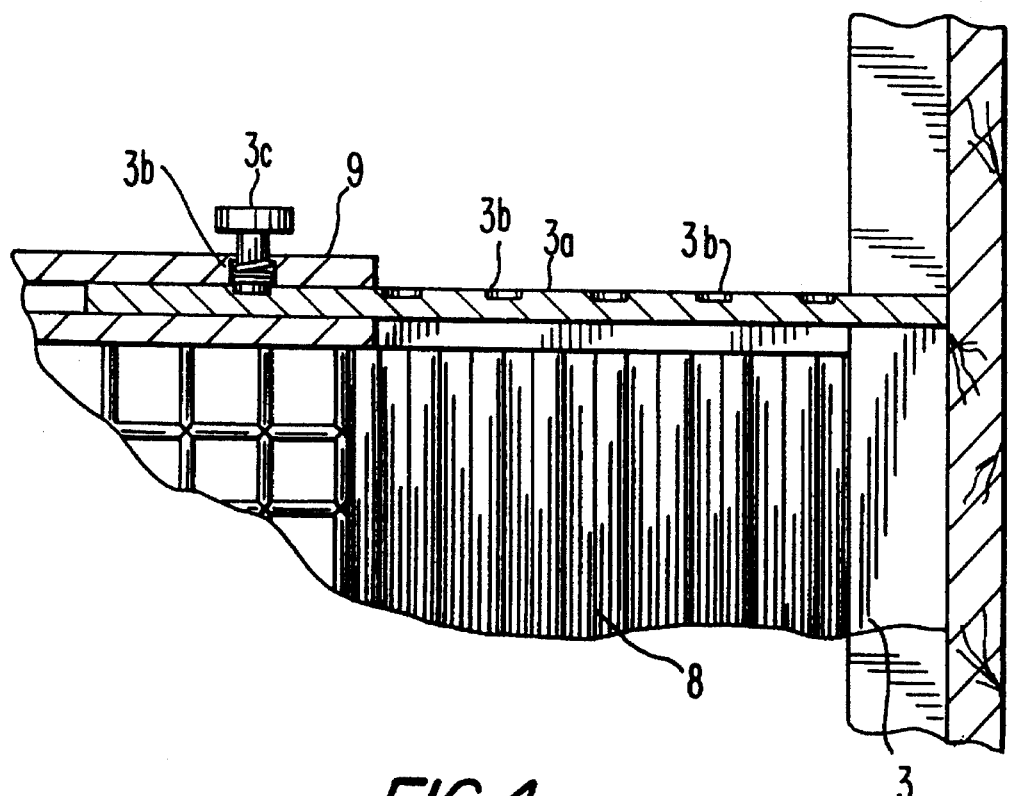
FIG. 4 is a closeup view of the locking portion of the bin, along lines 4—4 of FIG. 1.

The bin container 1 of the present invention provides an owner of a cat or pet with the visibility of the cat or pet while the animal is resting in container 1, allowing the pet owner to view the cat or pet in bin container 1 as well as for the pet to see both the outside environment and interior of the window of the apartment or room in which bin container I is mounted.

Bin container 1 of the present invention is a pet window box, as shown in the drawings. Bin container 1 permits a pet to rest outdoors. While bin container 1 may be made of any suitable lengthwise rigid or semi-rigid open mesh wire, preferably bin container 1 is made from a vinyl coated wire, which is colored white to prevent heat accumulation of the wires from sunlight. Such a wire is manufactured by Lee/Rowan for baskets and by Closet Maid of Clairol International for shelving.

Bin container 1 is adapted to be mounted to a window sill while permitting the cat or other pet to have access from the interior of a room to the fresh air outside, while staying protected within bin container 1. Bin container 1 has a removable floor for the pet and an optional waste receptacle.

Bin container 1 is mountable to a window sill while permitting access from the interior of a room into bin container 1.

Bin container 1 is designed to allow a cat to sit outdoors for an extended period of time, thus satisfying the cat's natural urge to perch outside.

To permit pet access bin container 1 has an opening 13, which opening 13 may be provided within vertical front wall 20 for the cat or pet to enter and exit bin container 1.

Front and rear slidable, openable panels 2, 3 of bin container 1 are received within vertical channels 5, 6 of a conventional "apartment" window 1, to secure container 1 in window 7, so that window pane 14 of window 7 may be completely closed when not in use.

Top roof 15 and bottom floor 16 and vertical walls 17, 18, 19, 20 walls of bin container 1 include preferably a wire mesh, such as manufactured by Lee/Rowan or Closet Maid of Clairol International, as noted above, to allow the pet access to fresh air and sunshine. However, other suitable materials such as galvanized metal wires may also be used.

Pet porch bin container 1, including top roof 15, bottom floor 16, and three open-mesh vertical walls 17, 18, 19, also includes front vertical wall 20, which front vertical wall 20 includes opening 13 having an optional hinged door 21 of sufficient size as to permit a pet such as a cat to travel therethrough.

Optional hinged door 21 may include hinge 22 at a top of optional hinged door 21, wherein hinge 22 is at the upper edge 23 of opening 13, to allow optional hinged door 21 to swing open in either direction while being urged or pushed by the cat or pet, after which time optional hinged door 21 closes by gravity.

Bin container 1 is held at window sill 12 and against falling away from window 7 by openable panels 2, 3 extending from front wall 20 of bin container 1 and so as to engage vertical channels 5, 6 of window 7. Bin container 1 is held to window 7 and is prevented from falling away from window 7, by slidable, openable panels 2, 3 slidably extending from window end 4 of bin container 1 and engaging inside vertical channels 5, 6 of window 7 and to prevent the falling of bin container 1 from window 7. Optionally, as shown in FIGS. 6 and 7, support tabs 7a may be installed under bin container 1 to stabilize bin containe 1 upon window sill 12 of window 7.

To secure bin container 1 within window 7, front and rear slidable, openable panels 2, 3 of bin container 1 may be provided with flexible corrugated foldings 8.

In the alternative, as shown in the drawing FIGS. 2 and 3, bin container 1 may have front top and lower slidable tracks 9, 9' and rear top and lower slidable tracks 10, 10', so that the entire volume of bin container 1 may be expanded by moving expandable slidable bin extension portion 11 outward from bin container 1.

Bin container 1 is easily installable in window 7, so that panels 2, 3 engage vertical channels 5, 6 of window 7. Slidable, openable panels 2, 3 extend laterally within front top slidable tracks 9, 9' to close off window 7 to bin container 1. Rear movable panel 24 moves within rear slidable tracks 10, 10', so that when bin container 1 for animal pets extends out of the opening of window 7, bin container 1 may expand in size with expandable slidable bin extension portion 11. Expandable, slidable bin extension portion 11 increases the size of bin container 1 and permits bin container 1 to be inserted in window 7 like a conventional air conditioner so that bin container 1 is secured above window sill 12 of window 7. For stability, front slidable top track 9 and front lower slidable track 9' are interconnected by vertical braces 9a, 9b.

To expand the size of bin container 1, vertical wall 17 of bin container 1 may be provided connected at each edge with front slidable, openable panel 2 and rear movable panel 24. Panels 2, 24 are slidably received within hollow grooves 25, 26 of front top slidable track 9 and rear top slidable track 10 respectively mounted across the top of bin container 1.

After bin container 1 is mounted in window 7, vertical wall 17 and front slidable, openable panel 2, and rear movable panel 24, are moved sideways, to expand the size of bin container 1 to include expandable slidable bin extension portion 11.

It is noted that the drawing FIG. 1 shows expandable slidable bin extension portion 11 openable to the left, and slidable openable panel 3 movable to the right to hold bin container 1 in place. However, it is noted that bin container 1 can be constructed with a mirror image of expandable slidable bin extension portion 11 on the right, wherein slidable openable panel 2 is also located on the right instead of slidable openable panel 3, as in FIG. 1, thus opening bin container 1 on either side, or bin 1 can include a mirror image of slidable, openable panel 3 on the left in a non-expandable embodiment.

As shown in FIG. 4, slidable openable panel 3 includes top member 3a having a plurality of indentation recesses 3b. Spring loaded pin 3c is insertable within any one recess 3b to lock top member 3a in a predetermined fixed position.

Figure 5:
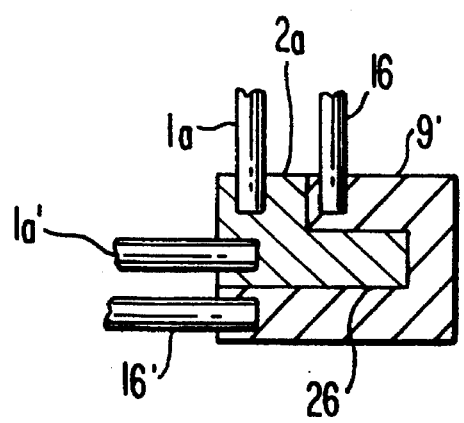
FIG. 5 is a closeup view of a portion of the bin along lines 5—5 of FIG. 1.
Figure 9:
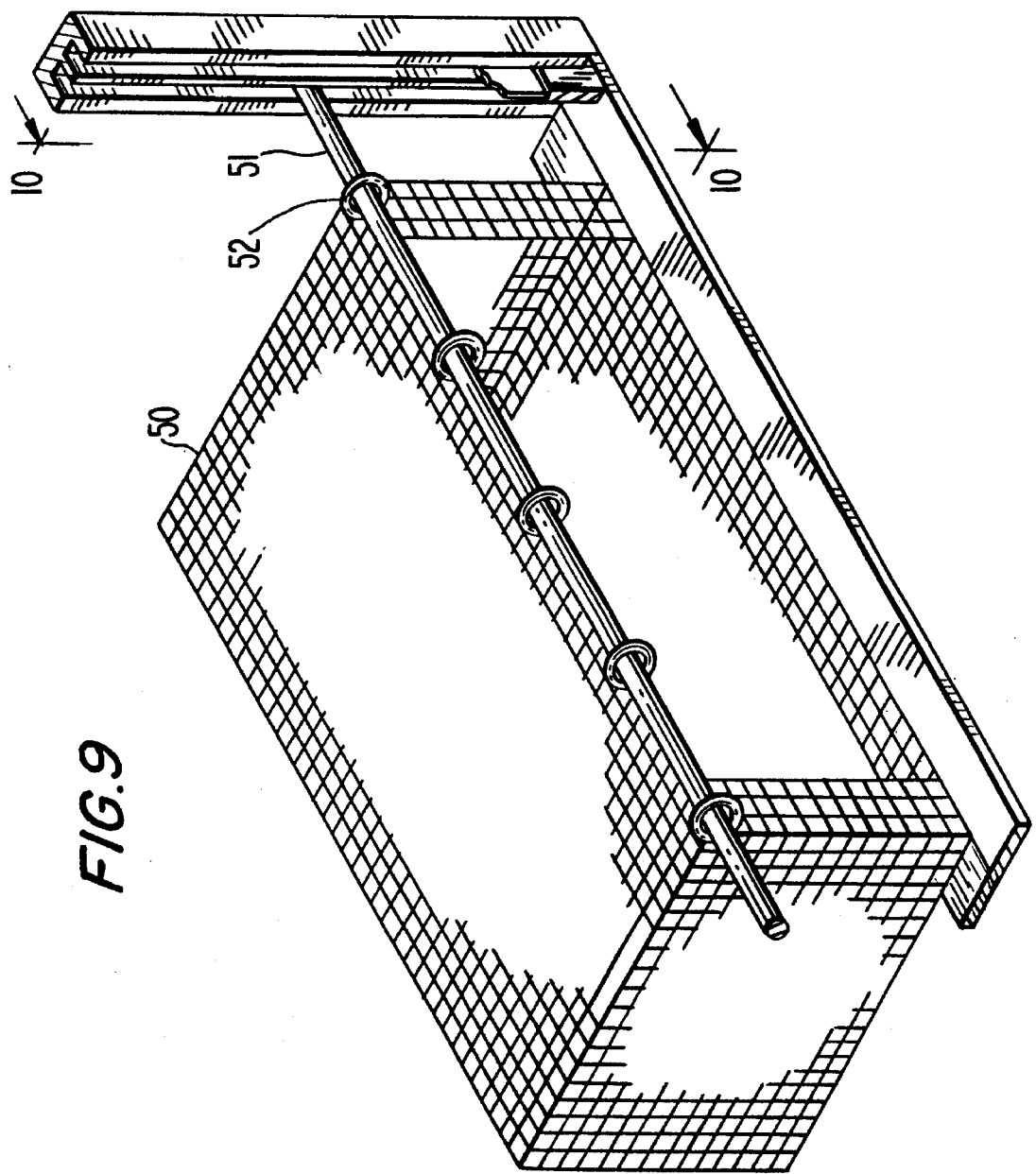
FIG. 9 is a perspective view showing an alternate embodiment of the bin installed in a closed window.

As shown in FIG. 5, lower edge member 2a' of openable slidable panel 2 moves within groove 26 of lower track 9'. Bin wires 1a, 1a' extend from lower edge member 2a' and bin wires 1b, 1b', of lower track 9'.

Bottom floor 16 may include a removable mat 16a, such as fabric or straw, or may be provided with a conventional waste receptacle (not shown).

In an alternative embodiment as shown in FIGS. 9–12, bin container 50 is held in place by a horizontally installable rod 51 connected to bin container 50 by ring fasteners 52 which surround rod 51 and which extend through the wire mesh opening within bin container 50. Rod 51 is slidable into vertical channels 5, 6 of window 7.

It is noted that, unlike the prior art, bin container 1 of the present invention expands in size while permitting window 7 to fully close when bin container 1 is not in use.

It is noted that other modifications may be made by those skilled in the art which will still embody the principles and spirit of the invention. It is intended to be limited only by the scope of the appended claims.

I claim:

1. A window pet enclosure comprising in combination: a window frame having a sill, said frame having a pair of vertically aligned channels in each side of the window frame, a bin container having a top roof, a bottom floor opposite said top roof, a plurality of vertical walls, an expandable, slidable bin extension portion on one side of said bin container, means for mounting said bin container to said window frame, said means for mounting said bin container being a pair of openable, slidable panels, said slidable panels being movably connectable to said bin container, each of said openable slidable panels slidable within the respective vertical channels of said window frame, said bin container further having an opening in a front wall of said plurality of vertical walls of said bin container, and means for closing said opening.

2. The window pet enclosure according to claim 1, wherein said means for closing said opening is a hinged swinging door.

3. The window pet enclosure according to claim 1, wherein said vertical walls of said bin container include an open mesh.

4. An expandable open mesh window pet enclosure comprising in combination, a window frame having a pair of vertically aligned channels on each side of said window frame, a bin container having a bottom floor and a top roof, four vertical walls connecting said bottom floor and said top roof, one of said vertical walls having an opening for the passage of a pet therethrough, a means for mounting said bin container to said window frame, said means for mounting said bin container including a pair of openable, slidable panels connected to said bin container, said openable, slidable panels being movably connected to said bin container, said openable slidable panels being slidably movable within said vertical channels of said window frame, said openable, slidable panels supporting said bin container to said window frame.

5. The window pet enclosure according to claim 4, wherein said bin container is generally rectangular when viewed in cross-section.

6. The window pet enclosure according to claim 4, further comprising a means for expanding an inner volume of said bin container, said means including a slidably expandable, bin extension portion having a pair of movable panels, and a pair of tracks, each said movable panel movable within a respective track provided upon said container, said movable panels further being connected to one movable vertical wall of said four vertical walls, said movable vertical wall being connected to said pair of movable panels for expanding the interior volume of said bin container.

7. An expandable window pet enclosure comprising in combination a bin container inserted within a window frame, wherein said window frame has a pair of vertical channels on opposite sides of said window frame, said expandable window pet enclosure comprising a roof, a bottom floor and four vertical walls interconnecting said top roof and said bottom floor, one first vertical wall of said vertical walls having an opening, said opening providing egress therefrom, said opening having a door for closing said opening, means for mounting said bin container to said window frame wherein said opening faces a building interior adjacent to said window frame, said mounting means including said bin container being fastenable to a rod, said rod having a first end, and a second ends said first end of said rod and said second end of said rod inserted in said window frame channels of said window frame in a horizontal position, said bin container hanging from said rod.

8. A window pet enclosure comprising in combination a window frame and a removable, bin container for animal pets, which said bin container is adapted to interfit within, project from and extend the opening of a standard window frame, said window frame having a pair of vertically aligned channels on each side of said window frame, said bin container having a top roof and a bottom floor connected by four vertical walls, a horizontally slidable attaching means, said bin container having a further slidably expandable bin extension portion, said bin container having an entrance within an interior room of a building, said bin container inserted in and removable from said window frame, said bin container provided with a door to an entrance opening, said bin container slidably mounted inside said vertical channels of said window frame, and said bin container including a wire mesh in communication with open air outdoors.

* * * * *